P. B. LILLEY.
FEEDING TROUGH.
APPLICATION FILED MAR. 16, 1918.

1,276,087.

Patented Aug. 20, 1918.

Inventor
P. B. LILLEY
By Watson E. Coleman
Attorney

UNITED STATES PATENT OFFICE.

PHAREZ B. LILLEY, OF PROSSER, NEBRASKA.

FEEDING-TROUGH.

1,276,087.                     Specification of Letters Patent.      Patented Aug. 20, 1918.

Application filed March 16, 1918.   Serial No. 222,911.

*To all whom it may concern:*

Be it known that I, PHAREZ B. LILLEY, a citizen of the United States, residing at Prosser, in the county of Adams and State of Nebraska, have invented certain new and useful Improvements in Feeding - Troughs, of which the following is a specification, reference being had to the accompanying drawings.

This invention relates to animal feed troughs and has for its primary object to provide a trough so constructed that waste of the feed by the animal is prevented and considerable economy is thus realized.

It is another object of my invention to provide an animal feed trough and means operated by the animal in the act of taking the feed into its mouth for automatically supplying the feed in predetermined uniform quantities to the trough.

It is also an important object of the invention to provide an animal feed trough which will be thoroughly sanitary and can be easily cleaned.

The invention also has for a further general object to provide a device of the above character which is exceedingly simple in its construction, can be manufactured at comparatively small cost and which is highly convenient and serviceable for the purpose in view.

With the above and other objects in view the invention consists in the improved combination and arrangement of the several parts as will be hereinafter more fully described, subsequently claimed and illustrated in the accompanying drawings in which similar reference characters designate corresponding parts throughout the several views, and wherein;

Figure 1:
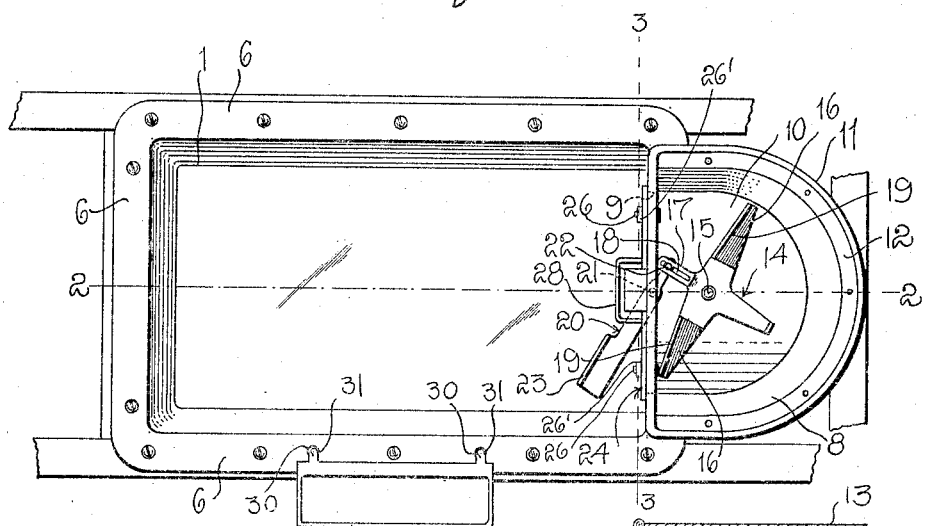
Figure 1 is a top plan view of a feed trough constructed in accordance with the preferred embodiment of my invention.
Figure 2:
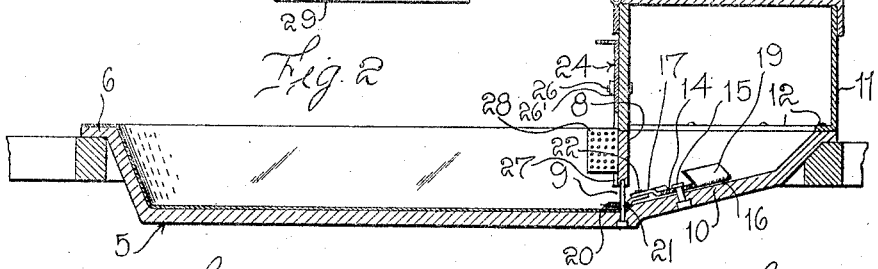
Fig. 2 is a section taken on the line 2—2 of Fig. 1.
Figure 3:
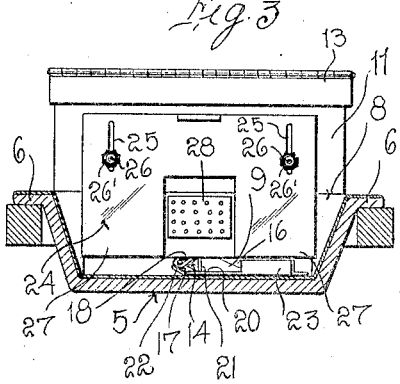
Fig. 3 is a section taken on the line 3—3 of Fig. 1.
Figure 4:
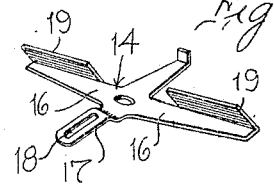
Fig. 4 is a detail perspective view of the rotatable feed supply member.

Referring in detail to the drawing, 5 designates the body of the trough which is preferably, though not necessarily, of rectangular form in cross section and provided upon one of its end edges and its longitudinal edges with an outwardly projecting flange 6. This flange is provided at spaced points with openings to receive suitable attaching screws whereby the trough may be securely mounted upon spaced bars extending across a stall.

Upon one end of the trough body 5 and exteriorly thereof a feed receiving chamber 8 is integrally formed. This chamber communicates with the interior of the trough through the slot or opening 9 in the end wall of the trough. The bottom wall 10 of the chamber 8 is disposed above the plane of the bottom wall of the trough 5 and gradually slopes or inclines downwardly to the opening 9 so as to cause a gravity movement of the feed toward said opening. The trough body and the chamber extension are preferably in the form of a single iron casting, all surfaces of which may be enameled so as to facilitate the easy, quick and thorough cleaning of the trough.

11 designates the bottomless hopper, the wall of which is inwardly flanged at its lower end as at 12 and said flange bolted or otherwise permanently secured upon the wall of the chamber 8. The hopper at its upper end is provided with a hinged top or cover 13 whereby it may be completely closed.

Upon the base wall 10 of the chamber 8, a feed discharge member 14 is oscillatably mounted upon a pin or stud 15 fixed in the base wall of the chamber. This member is provided with a plurality of radially extending arms 16 and an additional relatively short arm 17 in which a slot 18 is formed. The diametrically opposite arms 16 are provided upon their corresponding longitudinal edges with inclined flanges 19 for the purpose of pushing the feed in predetermined quantities downwardly over the inclined base wall 10 of the feed chamber and through the opening 9 into the main trough chamber. Through the opening 9 a lever 20 extends and is pivoted upon the base wall, as shown at 21. This lever is provided upon one end with an upwardly projecting terminal lug 22 loosely engaged in the slot 18 of the arm 17. At its opposite end, the lever has an upstanding flange 23 formed thereon which is disposed in spaced relation to the end wall of the trough.

24 designates a feed regulating plate which is arranged upon the exterior of the side wall of the hopper 11 and is provided with longitudinal slots 25 to receive the bolts 26 fixed in the hopper wall. Suitable clamping nuts 26' are threaded on these bolts to clamp said plate in its adjusted position.

The plate at its lower end is formed with longitudinally projecting downwardly extending wings 27 which are adapted to extend over the opening 9 at either side of the lever 20. It will thus be seen that by vertically adjusting this plate, a greater or less portion of the opening 9 may be uncovered to permit of the passage or flow of a predetermined quantity of feed through the opening 9 into the trough. Upon the end wall of the trough immediately above the opening 9, a casing 28 having a perforated wall is secured. This casing is adapted to receive a suitable absorbent saturated with a disinfecting fluid.

29 designates a salt bar receiving pan which is provided upon one of its marginal walls with the curved lugs 30 adapted to be engaged through spaced openings 31 in the flange 6 on one longitudinal wall of the trough 5.

In the operation of the device as above described, the horse or other animal sweeps up the grain or feed upon the bottom wall of the trough with its upper lip, while the lower lip serves to direct the grain into the mouth. In this movement of the upper lip, the lip strikes the flange 23 on the lever and moves the lever laterally in one direction, thereby oscillating the member 14 so that one of the flanged arms 16 thereof will positively force or discharge a predetermined quantity of the feed from the chamber 8 into the trough 5. This feed collects between the end wall of the trough, and the flange 23 on the lever and when the animal engages his lip over the lever to sweep the grain to the center of the trough, he will move the lever in an opposite direction and thus reverse the oscillation of the member 14 so that the grain will be fed through the opposite ends of the opening 9 in the end wall of the trough. Thus only a limited quantity of the grain is accessible to the animal and this quantity may be properly predetermined so that at no time can the animal take more grain into its mouth than it can properly masticate. Thus it is impossible for the animal to crowd its mouth with grain, and by shaking its head, throw or scatter the grain on the ground which will result in a considerable monetary loss to the owner.

The invention as a whole, is of very simple construction and as the trough is entirely constructed of metal, it will not absorb the saliva and attract flies or other insects. As the trough is preferably lined with porcelain, it can be easily washed or cleaned after each feeding. I have above referred to the trough body as provided with the flanges 6 for the purpose of mounting the trough in a stall, but it will be understood that the invention is not to be thus limited as various other means for mounting or supporting the trough might be adopted. It is further to be understood that while I have herein shown and described the preferred construction and arrangement of the several parts of the device, the same are susceptible of considerable modification, and I therefore reserve the privilege of adopting all such legitimate changes as may be fairly embodied within the spirit and scope of the invention as claimed.

Having thus fully described my invention, what I desire to claim and secure by Letters Patent is:

1. In combination with an animal feed trough having its base wall at one end upwardly inclined, of a feed receiving chamber mounted above the inclined end of said base wall and having a feed outlet opening, an oscillatable feed member mounted upon the inclined base wall of the trough and of a diameter substantially equal to the width of said base wall, a lever pivotally mounted upon said base wall in the feed outlet opening and operatively connected at one of its ends to said member, said lever at its other end having an upstanding flange for engagement by the lip of the animal in collecting the grain, whereby said member is oscillated to feed the grain through said opening and into the trough.

2. In combination with an animal feed trough having its base wall at one end upwardly inclined, of a feed receiving chamber mounted above the inclined end of said base wall and having a feed outlet opening, an oscillatable feed member mounted upon the inclined base wall of the trough and of a diameter substantially equal to the width of said base wall, said member having arms extending radially in opposite directions from its axis, each having a portion disposed in the plane of said inclined base wall and in contact therewith and an obliquely inclined longitudinal flange on one edge thereof to positively feed the grain to the outlet opening, and a lever pivotally mounted upon said base wall in the feed outlet opening and operatively connected at one of its ends to said member, said lever at its other end having an upstanding flange for engagement by the lip of the animal in collecting the grain, whereby said member is oscillated to feed the grain through said opening and into the trough.

In testimony whereof I hereunto affix my signature in the presence of two witnesses.

PHAREZ B. LILLEY.

Witnesses:
CHAS. G. UNDERWOOD,
JOHN D. GOUDY.